No. 775,570. Patented November 22, 1904.

UNITED STATES PATENT OFFICE.

AUGUST LEOPOLD LASKA, OF OFFENBACH-ON-THE-MAIN, GERMANY, ASSIGNOR TO THE FIRM OF K. OEHLER, OF OFFENBACH-ON-THE-MAIN, GERMANY.

DARK-BLUE SULFUR DYE.

SPECIFICATION forming part of Letters Patent No. 775,570, dated November 22, 1904.

Application filed May 26, 1904. Serial No. 209,841. (No specimens.)

*To all whom it may concern:*

Be it known that I, AUGUST LEOPOLD LASKA, doctor of philosophy, chemist, residing at 5 Gerberstrasse, Offenbach-on-the-Main, Germany, have invented new and useful Improvements in Dark-Blue Sulfur Dyes, of which the following is a specification.

From the indications made in chemical literature about those derivatives of diphenylamin which result from the condensation of dinitro-chloro benzene (Cl:NO$_2$:NO$_2$=1:2:4) with the derivatives of p-amidophenol, wherein both the ortho positions to the oxy group are substituted, it is to be supposed that by converting the said diphenylamin derivatives into sulfur dyes by melting it with alkali polysulfids an elevated temperature is necessary—for instance, in the French Letters Patent No. 336,630 it is said that a dyestuff from dinitro-dichloro-oxydiphenylamin of the following constitutional formula

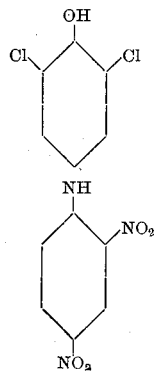

begins to form not earlier than at 160° centigrade and will only be finished at 170° centigrade. In the German Letters Patent No. 133,940 a sulfur dye is described, derived from dinitro-phenyl-oxytolylamin-carbonic acid, the formation of which is, according to the statements in the German Letters Patent No. 129,885, completed at 150° centigrade. Contrary to these facts, I have found that at a very much lower temperature—that is to say, already at about 100° centigrade—the dinitro-phenyl-chloro-oxytolylamin of the constitution

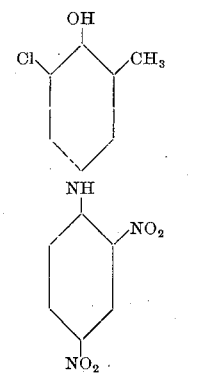

can be converted to a sulfur dye, and its shades, also contrary to the above-mentioned dyestuffs, are not black, but dark blue.

The dinitro-phenyl-chloro-oxytolylamin may be obtained by the condensation of dinitro-chloro benzene (Cl:NO$_2$:NO$_2$=1:2:4) with para-amido-ortho-chloro-ortho cresol, (OH:CH$_3$:NH$_2$:Cl=1:2:4:6,) whereas this body results from reducing the corresponding nitro compound by means of zinc and acetic acid. It melts at about 139° to 140° centigrade and is rather difficultly soluble in water. In order to carry out the condensation, 153.5 parts of para-amido-ortho-chloro-ortho cresol and 202.5 parts of dinitro-chloro benzene are boiled together in an alcoholic aqueous solution during about four hours in a vessel provided with a reflux condenser, while adding one hundred and forty parts of sodium acetate in order to bind the nascent hydrochloric acid. The resulting dinitro-phenyl-chloro-oxytolylamin separates as a reddish precipitate. It is filtered off and dried as usual. It dissolves in concentrated sulfuric acid and in diluted soda-lye with a brown color and precipitates from the latter solution in orange-red flocks on addition of hydrochloric acid.

The following example will illustrate the manner in which the dyestuff may be prepared: Melt together three hundred parts of crystallized sodium sulfid, one hundred and twenty parts of sulfur, and two hundred parts of water. Next, at 80° to 90° centigrade, add seventy-five parts of dinitro-phenyl-chloro-oxytolylamin. Then heat the whole in a reflux condenser. After about twenty hours the formation of the dyestuff is finished. Then dry the melt by evaporating at 105° to 110° centigrade. The coloring-matter thus obtained gives in water a greenish-blue solution from which it precipitates in brown flocks on addition of hydrochloric acid. It dissolves in concentrated sulfuric acid with a blue color and is dyed on cotton from a bath containing sodium sulfid, yielding dark-blue shades of a very good fastness.

The temperature during the melting process may be raised until 125° centigrade without essentially interfering the shade. When increasing the temperature, it becomes some more blackish. It is also possible to isolate the dyestuff from the solution by a current of air or precipitating by an acid.

Now, what I claim, and desire to secure by Letters Patent, is the following:

1. The process of producing a dark-blue sulfur dye, consisting in heating together with alkali polysulfids at a temperature of about 100° to 125° centigrade, the dinitro-phenyl-chloro-oxytolylamin obtainable by condensing dinitro chloro benzene ($Cl:NO_2:NO_2 = 1:2:4$) with para-amido-ortho-chloro-ortho cresol ($OH:CH_3:NH_2:Cl = 1:2:4:6$), substantially as described.

2. As a new article, the dyestuff, which is obtained from melting together with alkali polysulfids at a temperature of about 100° to 125° centigrade the dinitro-phenyl-chloro-oxytolylamin, resulting from condensing dinitro-chloro benzene ($Cl:NO_2:NO_2 = 1:2:4$) with para-amido-ortho-chloro-ortho cresol ($OH:CH_3:NH_2:Cl = 1:2:4:6$) which yields on cotton when dyed in a bath containing sodium sulfid, dark-blue shades, dissolves in concentrated sulfuric acid to a blue and in water containing sodium sulfid to a greenish-blue solution from which it separates on addition of hydrochloric acid, in brown flocks, all substantially as herein described and claimed.

In testimony whereof I have signed my name to this specification in the presence of two subscribing witnesses.

AUGUST LEOPOLD LASKA.

Witnesses:
HERMANN WEIL,
ELSA KAUFFMANN.